United States Patent [19]

Müller

[11] 4,340,156

[45] Jul. 20, 1982

[54] ARRANGEMENT FOR SUPPLYING MOLTEN PLASTIC MATERIAL

[75] Inventor: Walter Müller, Battenberg, Fed. Rep. of Germany

[73] Assignee: Ewikon Entwicklung und Konstruktion GmbH & Co. KG, Herford, Fed. Rep. of Germany

[21] Appl. No.: 190,825

[22] Filed: Sep. 25, 1980

[30] Foreign Application Priority Data

Sep. 26, 1979 [DE] Fed. Rep. of Germany ....... 2938832

[51] Int. Cl.³ .................. B29F 1/03; B67D 5/00; H05B 3/20
[52] U.S. Cl. .................. 222/146 HE; 137/334; 137/341; 138/33; 219/521; 239/135; 239/547; 425/549
[58] Field of Search ............... 425/542, 547, 548, 549, 425/DIG. 13; 264/DIG. 46, 328; 222/146 HE; 137/334, 341; 138/33; 219/521, 540, 523, 530; 239/135, 547

[56] References Cited

U.S. PATENT DOCUMENTS

| | | | |
|---|---|---|---|
| 2,834,992 | 5/1958 | Jupa | 425/548 |
| 2,871,517 | 2/1959 | Allard | 425/572 |
| 3,520,026 | 7/1970 | Stidham et al. | 425/572 |
| 3,812,228 | 5/1974 | Skoroszewski | 264/328.14 |
| 3,849,048 | 11/1974 | Bielfeldt | 425/570 |
| 4,219,323 | 8/1980 | Bright et al. | 425/572 |
| 4,276,014 | 6/1981 | Aoki | 425/548 |

FOREIGN PATENT DOCUMENTS 2734746  2/1979  Fed. Rep. of Germany ...... 425/548

Primary Examiner—Willard E. Hoag
Attorney, Agent, or Firm—Michael J. Striker

[57] ABSTRACT

An arrangement for supplying molten plastic material in heated condition to an injection mold has a plurality of heating passage forming elements which are formed as separate units capable of being mechanically assembled with one another, and each provided with a housing having at least one inlet and one outlet opening, and with an electrical heating member which is electrically controlled independently of the heating members of other heating passage forming elements.

32 Claims, 24 Drawing Figures

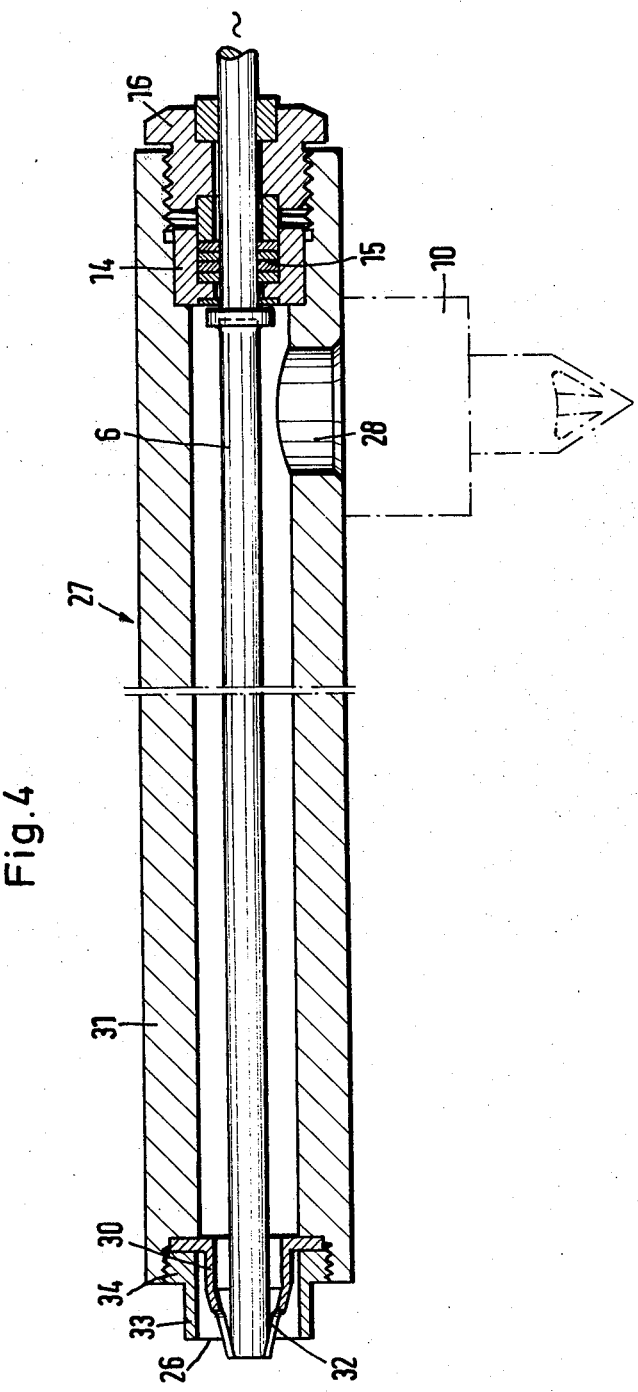

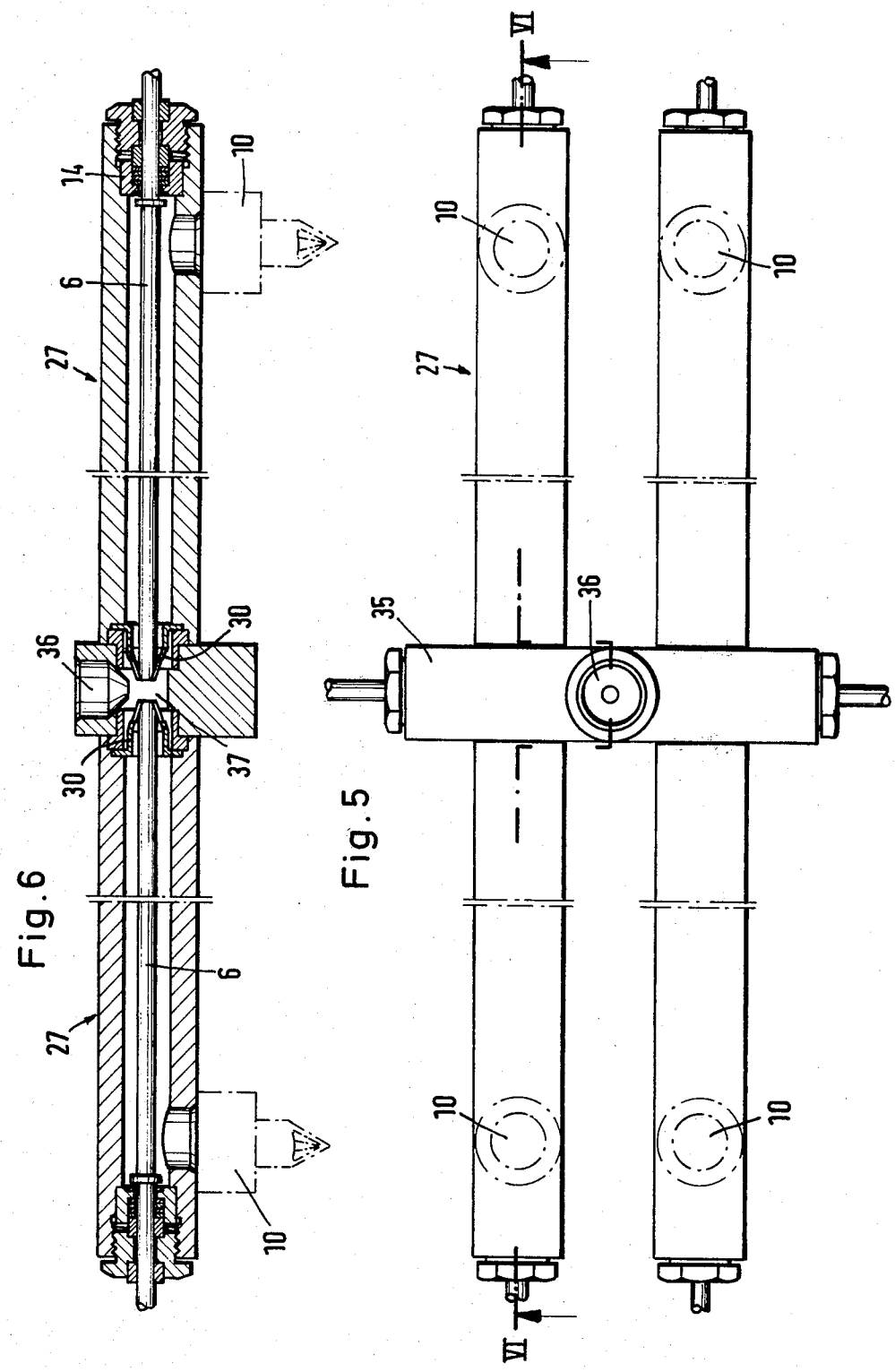

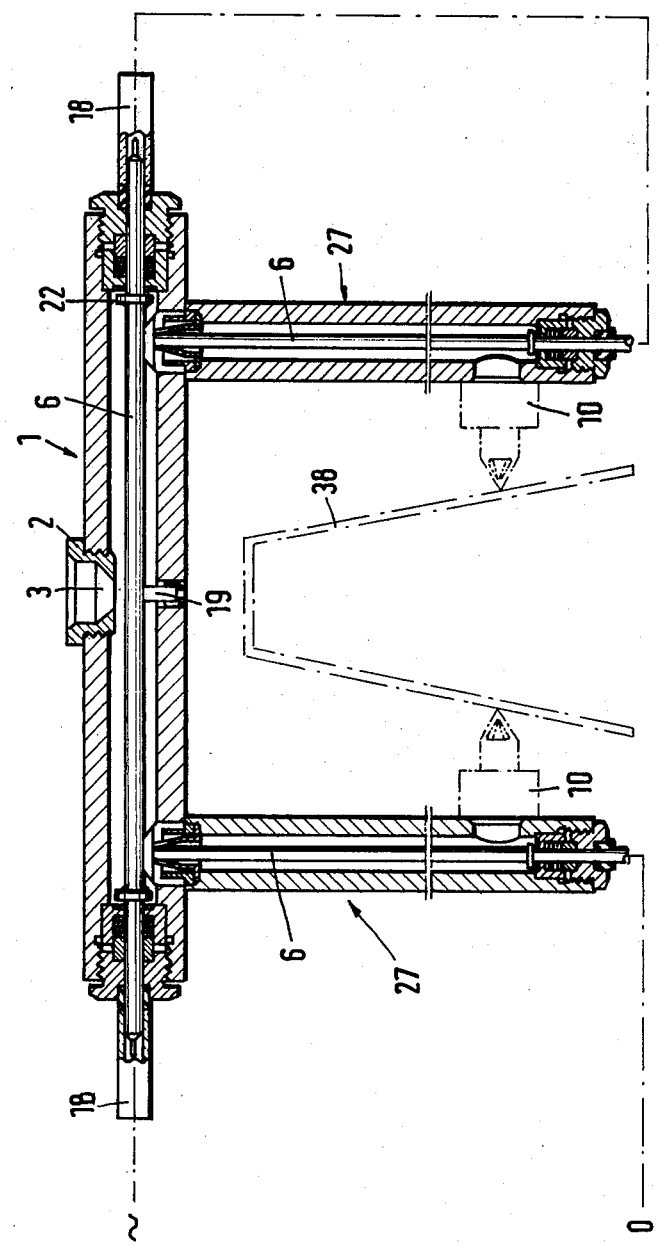

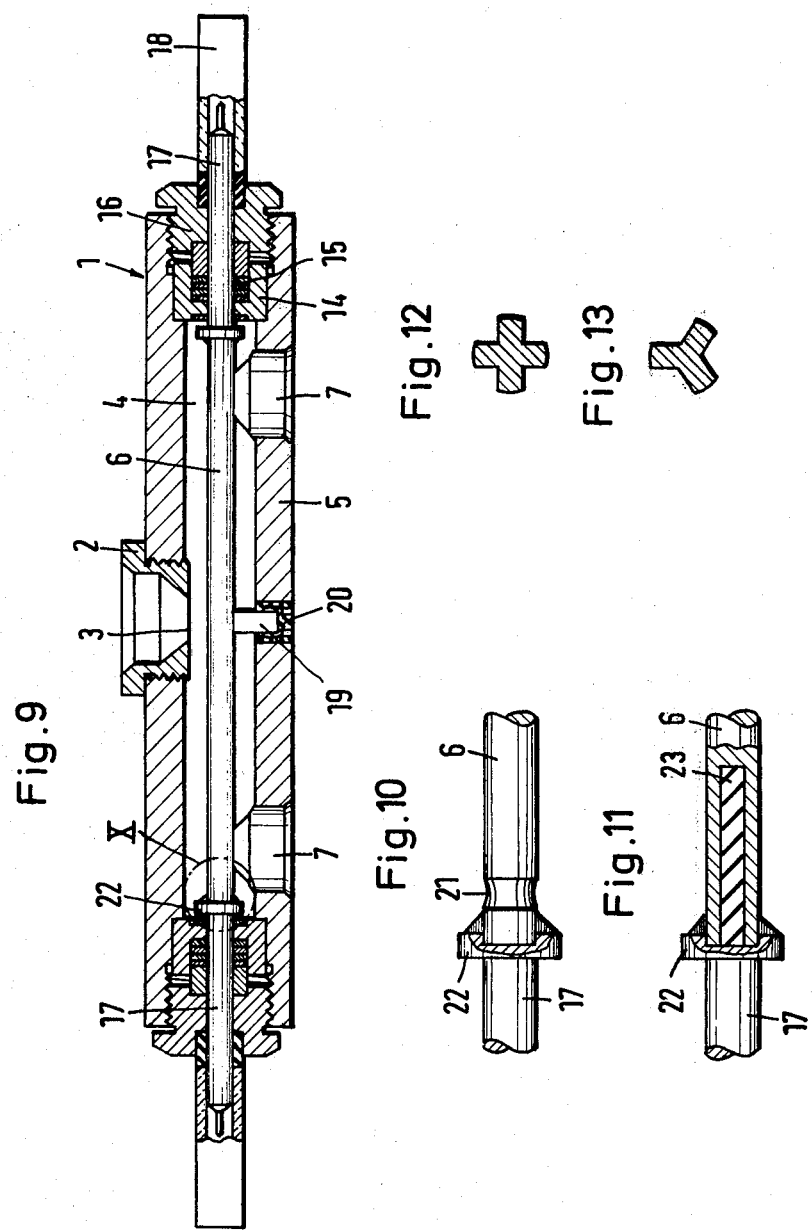

ARRANGEMENT FOR SUPPLYING MOLTEN PLASTIC MATERIAL

BACKGROUND OF THE INVENTION

The present invention relates to an arrangement for supplying molten plastic material via a heating passage forming element to an injection mold, preferably a multiple injection mold with individual injecting for each mold nest.

Arrangement of the above mentioned general type are known in the art. One of such arrangements is disclosed, for example, in Austrian Pat. No. 286,607. The arrangement disclosed in that patent is formed as a distributing plate which is firmly connected with a mold plate provided with mold nests. The distributing plate has horizontal distributing passages, and a vertical injection passage which branches from these horizontal passages and leads to point-shaped injection openings of the mold nests. The distributing passages are provided with central heating wires which are U-shaped in the region of the injection passages. The known arrangement provided with a system of heating passages completely rests on an injection mold and forms an integral component part of the same. Its parts cannot be utilized for assembling a heating passages system for an injection form which has a completely different construction. Different heating of various regions of the heating passages system is not possible.

SUMMARY OF THE INVENTION

Accordingly, it is an object of the present invention to provide an arrangement for supplying molten plastic material, which avoids the disadvantages of the prior art.

More particularly, it is an object of the present invention to provide an arrangement which is located between a plastic extruder and a cavity of an injection mold and provided with a heating passages system which allows different heating of various regions of the heating passages system for thermal treatment of the molten plastic material, and which also allows matching of the configuration of the heating passages system in a simple way to different injection molds.

In keeping with these objects and with others which will become apparent hereinafter, one feature of the present invention resides, briefly stated, in an arrangement in which a plurality of heating passage forming elements are provided which are formed as separate units capable of being mechanically assembled with one another, and each of the heating passage forming elements has a housing provided with at least one inlet opening and at least one outlet opening, and an electrical heating member which is electrically controlled independently of the heating members of other heating passage forming elements.

When the arrangement is designed in accordance with the present invention, so that the heating passages system is composed of separate heating passage forming elements which are formed as units capable of being mechanically assembly with one another, heating passages systems for completely different injection molds can be assembled from the identical components, namely the identical heating passage forming elements. The individual heating passage forming elements can also be utilized for assembling a heating passages system when a first associated injection mold has been used up and then must be renewed. The service life of the heating passage forming elements can thereby be fully utilized and is independent of the life of the injection mold.

Since each heating passage forming element has a heating member which is electrically controlled independently of the heating members of other heating passage forming elements, the inventive arrangement provides for the possibility to heat the individual heating passage forming elements differently. Thereby, the molten plastic material can be thermally treated differently in the different regions of the heating passages system.

In accordance with another feature of the present invention, a distributing element may be further provided which has an inlet opening and a plurality of outlet openings arranged to be connected with the inlet openings of the housings of the heating passage forming elements.

In accordance with still another feature of the present invention, the heating passage forming elements may be connected with one another so that their axes are parallel to, normal to or in alignment with one another.

The heating passage forming elements may be connected with one another so as to form a U-shaped structure to be associated with a multilevel injection mold. The heating passage forming elements may also have an H-shaped cross-section and be provided with heating members of the same cross-section.

The novel features of the present invention which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 4 is a longitudinal section of a heating passage forming element for connecting with a multiple side distributing element;

FIG. 5 is a view showing a distributing element with a plurality of heating passage forming elements located at opposite sides of the former and parallel to one another;

FIG. 6 is a view showing a section taken along the line VI—VI in FIG. 5;

FIG. 7 is a view showing heating passage forming elements which are arranged so as to form a vertical U-shaped structure;

FIG. 9 is a view showing a longitudinal section of a heating passage element in accordance with a further embodiment of the invention;

FIG. 10 is an enlarged view of the area X in FIG. 9;

FIG. 11 is a view substantially corresponding to that of FIG. 10 but showing another embodiment of the invention;

FIGS. 12 and 13 are views showing two cross-sections of a heating member of the heating passage forming element;

DESCRIPTION OF PREFERRED EMBODIMENTS

Figure 1:
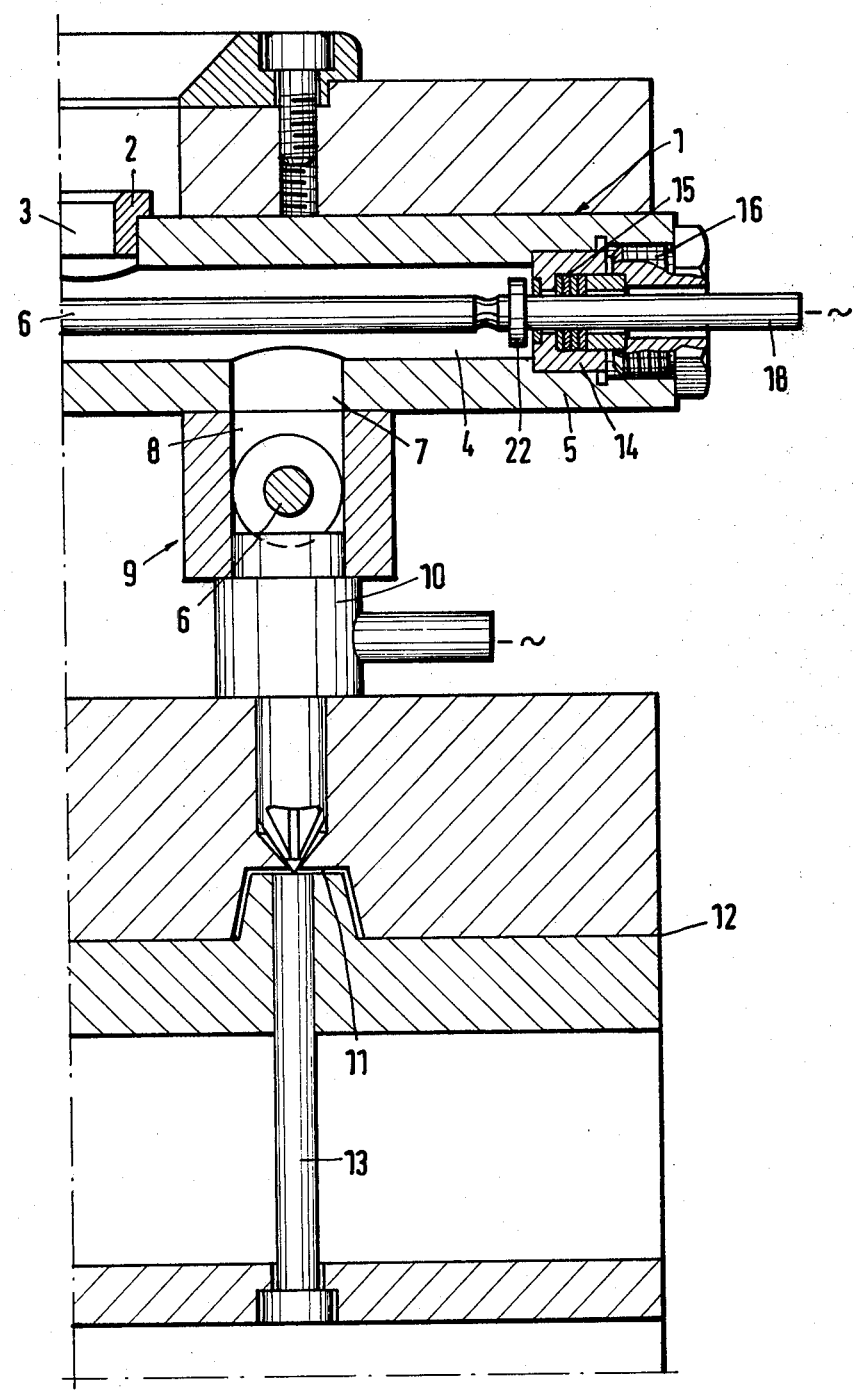
FIG. 1 is a view showing a section of a heating passages system and an injection mold.

An arrangement for supplying molten plastic material to an injection mold, shown in FIG. 1, has a heating passage forming element which is identified in toto by reference numeral 1 and is provided with a heating bush 2 in which the nozzle of a plastic extruder can be inserted. The heating bush 2 forms an inlet opening 3 for the molten plastic, the inlet opening being open into a passage 4 of the heating passage forming element 1.

The passage 4 is outwardly bounded by a housing 5 and inwardly bounded by an electric heating member 6. The molten plastic travels through an outlet opening 7 into a passage 8 of a second heating passage forming element 9.

The second heating passage forming element 9 is provided with a nozzle 10 through which the molten plastic passes and which guides the molten plastic into a mold nest 11 of the injection mold. The heating passage forming element 9 is provided in its central region with an electric heating member 6.

Opening of the injection mold for exposing the hardened molding is performed in the plane 12. The molding is removed from the mold nest by an ejector 13. The electric heating member 6 in the region of the housing end is supported in an insulating body 14. Sealing of the end portions of the heating member relative to the passage 4 is performed by a packing box 15 with a pressing screw 16. An end portion 17 of the heating member is provided with a bush 18 in which a plug of a current supply cable can be inserted. This plug connection is capable of loss-free transmission of high currents.

Since the heating passage forming element and thereby the heating member 6 have a great length, the heating element is provided with a supporting member 19 to support the same relative to the housing. An electrical insulating ring 20 is arranged between the supporting member 19 and the housing 5.

Since a part of the heat generated by the heating member 6 can be lost to the outside air through the end portion 17 extending outwardly beyond the housing 5, it is advantageous to provide the heating member 6 with a reduced section 21 shown in FIG. 10. The reduced section 21 provides for an increase of the electrical resistance. Thereby, considerably more heat is generated in this region. The heating member 6 is provided with a shoulder 22 adjacent to the insulating body 14 or to the end cap of the housing 5. Thereby, the heating member cannot displace inside the housing 5.

In the construction shown in FIG. 11, the reduction of the current-conductive cross-section adjacent to the shoulder 22 is obtained by the provision of an opening in the bush 6. The opening in the bush 6 is filled with an electrically non-conductive material 23.

The heating member may have a round cross-section or other cross-sections. It may have an angular cross-section or a cross-shaped cross-section shown in FIG. 12, or a star-like cross-section shown in FIG. 13.

Figure 2:
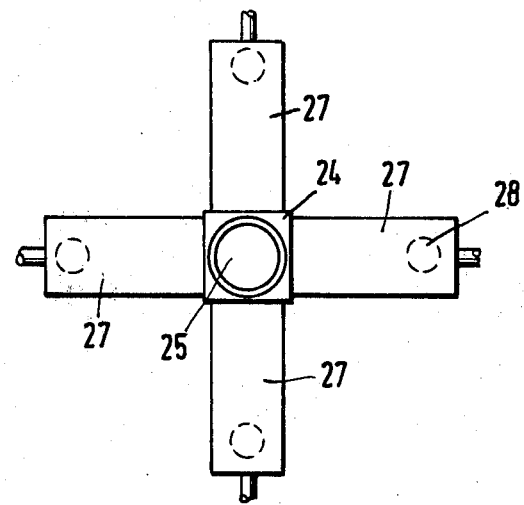
FIG. 2 is a view showing a square distributing element with a plurality of heating passage forming elements connected therewith.

The arrangement can be provided with a square distributing element 24 shown in FIG. 2. The distributing element 24 has an upper surface provided with an inlet opening 25 and lateral surfaces provided with outlet openings for the molten plastic. The outlet openings are connected with an inlet opening 26 provided at an end of a heating passage forming element 27. Each heating passage forming element 27 has at least one outlet opening 28 for the molten metal, in which a nozzle 10 is inserted.

Figure 3:
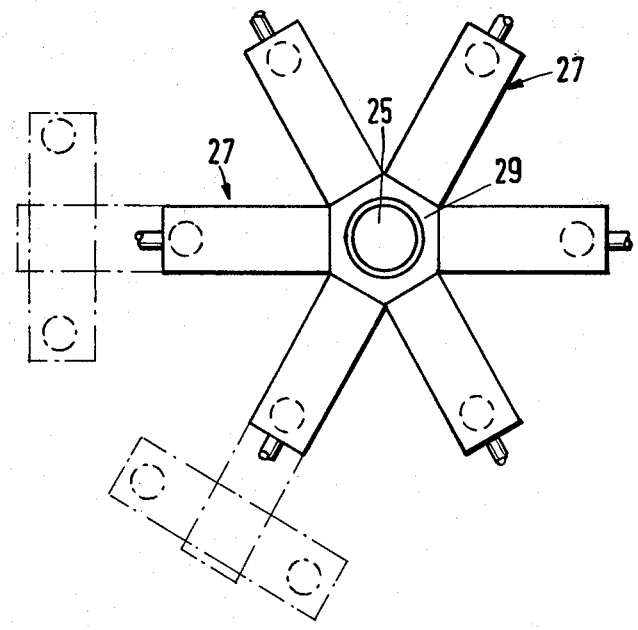
FIG. 3 is a view showing a hexagonal distributing element with a plurality of heating passage forming elements connected therewith.

In the arrangement shown in FIG. 3, a distributing element 29 is hexagonal and connected with six heating passage forming elements 27. The distributing element 29 guides the molten plastic from a machine nozzle via the inlet opening 25.

As shown in dotted lines in FIG. 3, the heating passage forming elements 27 are connected with further heating passage forming elements which extend transverse to the heating passage forming elements 27.

FIG. 4 shows the construction of the heating passage forming element 27. The electrical heating member has an end portion facing towards the inlet opening 26 of the heating passage forming element 27, the end portion being electrically connected with a holding insert 30 constituted of an electrically conductive material. The holding insert stabilizes the end portion of the heating member and forms an electrical connection between the heating member 6 and a housing 31 which is also constituted of an electrically conductive material. The holding insert 30 is provided with an overflow opening 32 for the molten plastic.

The inlet opening 26 is bounded by an outwardly projecting hollow sleeve 33 which is received in a recess of the distributing element and preferably has a round cross-section. The hollow sleeve is provided with a threaded flange 34. The threaded flange is screwed in a threaded opening of the housing 31 and fixes the holding insert 30 against the housing 31. The electric current flows in this construction via the heating member 6, the holding insert 30, and the housing 31.

Whereas the heating passage forming elements 27 of FIG. 2 together from a cross-shaped structure and the heating passage forming elements of FIG. 3 together form a star-like structure, there is the possibility to form with the heating passage forming elements 27, a heating passages system shown in FIGS. 5 and 6.

The distributing element 35 or a heating passage forming element supplies the molten plastic via an inlet opening 36. The molten plastic flows from a passage 37 of the distributing element 35 into the heating passage forming elements 27 and from there flows via the nozzles 10 into mold nests of the injection mold. At each side of the distributing element 35, two heating passage forming elements 27 which are parallel to one another, are provided.

FIG. 7 shows in dotted lines a molding 38 which occupies a great space. This molding can be injection molded fast at respective locations via the nozzles 10. The heating passages system includes a heating passage forming element 1 and two vertical heating passage elements 27 connected with one another. The heating members 6 of the three heating passage forming elements are electrically connected in series with a current source.

When the heating passages system is constructed as shown in FIG. 7, the mold nests of a multilevel injection mold for the molten metal can be supplied from such a system. The vertically extending heating passage forming elements 27 are provided in this case with several nozzles which are arranged at the respective levels.

Figure 8:
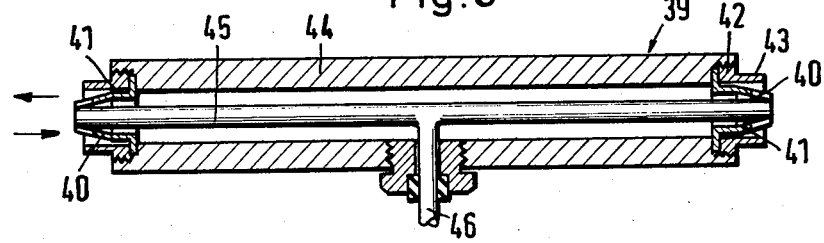
FIG. 8 is a longitudinal section of a heating passage forming element which is provided for overflow openings for the molten plastic material.

A heating passage forming element 39 shown in FIG. 8 is provided at its both sides with overflow openings 40 for the molten metal. The overflow openings 40 are provided in holding inserts 41 which are fixed to a housing 44 by a threaded flange 42 of a hollow sleeve 43. The holding inserts which are constituted of an electrically conductive material are electrically connected with a heating member 45 and the housing 44. The heating member 45 has a central current supply 46 which is insulated from the housing 44.

In the heating passage forming element 39, the molten plastic is supplied via one end inlet opening, passes through the inner passage of the heating passage forming element, and flows via the other end opening into a connected heating passage forming element.

Figure 14:
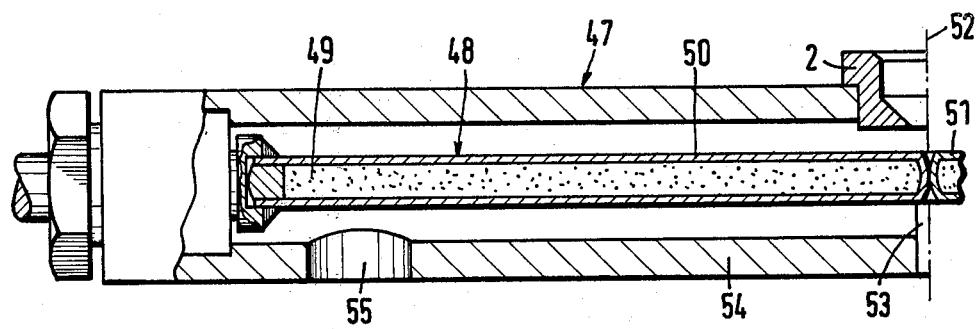
FIG. 14 is a view showing a section of a heating passage forming element in accordance with a further embodiment of the invention.

FIG. 14 shows a section of a heating passage forming element 47 which is provided with a hollow heating member 48. In such a construction, the heat exchange outer surface of the heating member is increased in relation to its conductive cross-section. In order to increase the mechanical stability, the inner chamber of the hollow heating member 48 is filled with a non-conductive stabilizing material 49.

As can be seen from FIG. 14, the heating member of the heating passage forming element 47 can also be composed of two parts 50 and 51 which are electrically connected in the region of a central plane 52 of the heating passage forming element. The connection region is supported relative to the housing 54 by a supporting member 53. The housing is provided with a feeding bush 2 which determines the inlet opening for the molten plastic. Further, the housing has outlet openings 55. In operation, the molten plastic which is hardened in the interior of the housing, forms an insulating layer.

Figure 15:
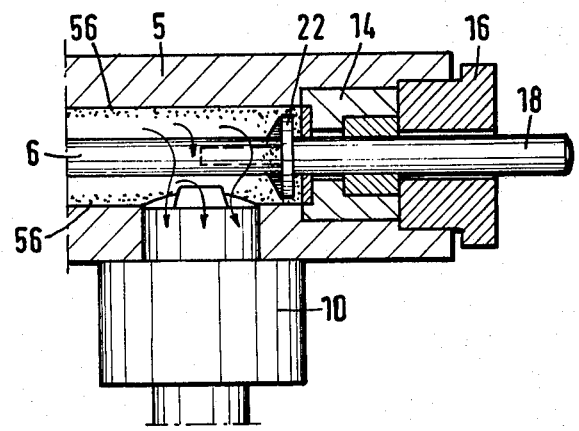
FIG. 15 is a view showing a section of a structural unit of a heating passage forming element.

As can be seen from FIG. 15, the hardened layer of the molten plastic is identified by reference numeral 56. It can be seen that in the region of the shoulder 22, the hardened plastic provides for a good insulation and sealing against the end cap of the housing 5. The molten plastic which is plasticized and flows into the nozzle 10 does not contact with the shoulder 22.

Figure 16:
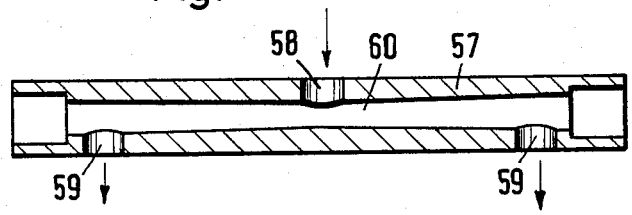
FIG. 16 is a view showing a housing of a heating passage forming element with a conically enlarged inner opening.

FIG. 16 shows a longitudinal section of a housing 57 of a heating passage forming element with an inlet opening 58 and outlet openings 59 for the molten plastic. The housing is provided with a passage 60 having a cross-section which conically increases from the central inlet opening 58 towards the outer outlet opening 59.

Despite the fact that the heating passage forming element loses more heat from the inlet opening for the molten plastic to the lateral ends, in the conical construction of the passage a considerable pressure decrease does not take place even in the event that the passage is very long.

Figure 17:
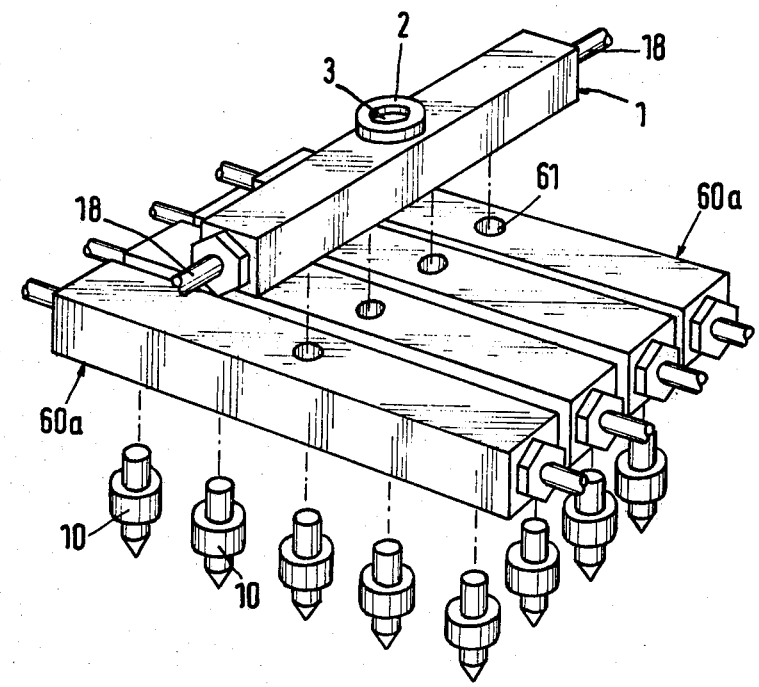
FIG. 17 is a perspective view of a heating passages system.

FIG. 17 shows a heating passages system in which the heating passage forming element 1 and the heating passage forming element 60a are arranged in different planes. The longitudinal axis of the heating passage forming element 60a extends at right angle to the longitudinal axis of the heating passage forming element 1.

The heating passage forming element 60a is provided with a row of the nozzles 10. The point injection is performed via the nozzles 10 into the mold nests of the injection mold. The molten plastic is supplied through the feeding bush 2 or the inlet opening 3 and travels via the passage of the heating passage forming element 1 through the inlet openings 61 in the heating passage forming element 60a and from there to the nozzles 10.

Figure 18:
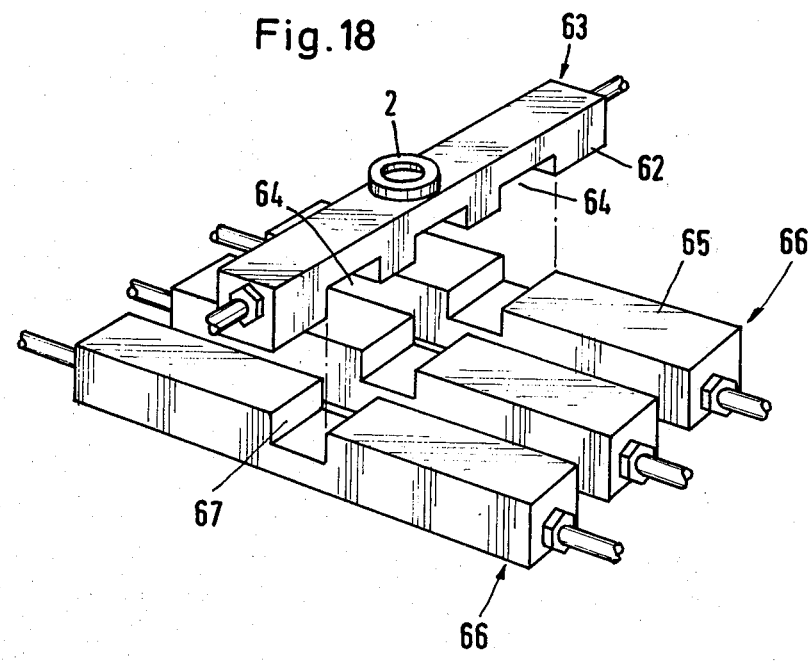
FIG. 18 is a view essentially corresponding to that of FIG. 17 but showing another embodiment of the invention.
Figure 19:
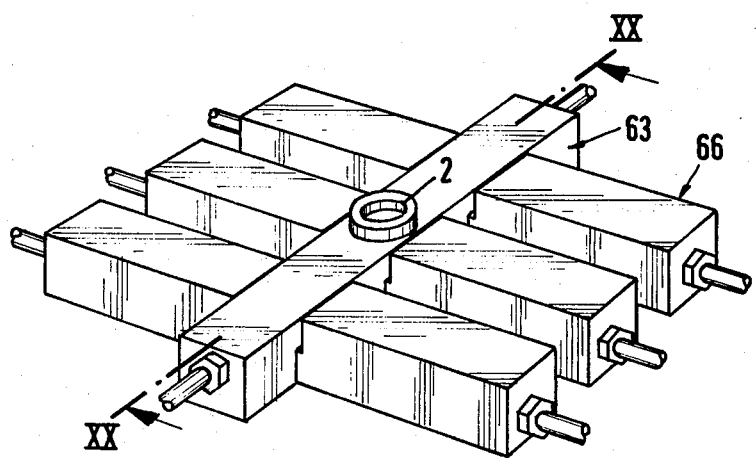
FIG. 19 is a view showing the heating passages system of FIG. 18 in assembled condition.
Figure 20:
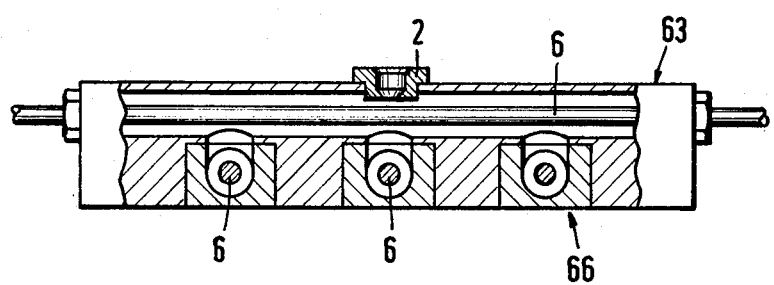
FIG. 20 is a view showing a section taken along the line XX—XX of FIG. 19.

When it is desired to reduce the distance between the heating members of the heating passage forming element 1 and the heating passage forming element 60a, the heating passage forming elements may be designed as shown in FIGS. 18-20. The housing 62 of a heating passage forming element 63 is provided with recesses 64, whereas a housing 65 of a heating passage forming element 66 is provided with recesses 67. The heating passage forming element 63 is connected with the heating passage forming element 66 as shown in FIGS. 19 and 20. The abovementioned heating passage forming elements engage in one another in shape-locking manner.

The electrical heating member 6 of the heating passage forming element 63, as shown in FIG. 20, is located at a small distance from the electrical heating member 6 of the heating passage forming element 66. Because of the small distance between the heating members of the coupled heating passage forming elements, a favorable thermal treatment of the molten plastic is obtained.

Figure 22:
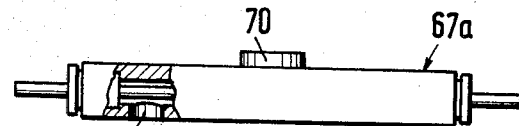
FIG. 22 is a view taken in the direction of the arrow XXII in FIG. 21.
Figure 21:
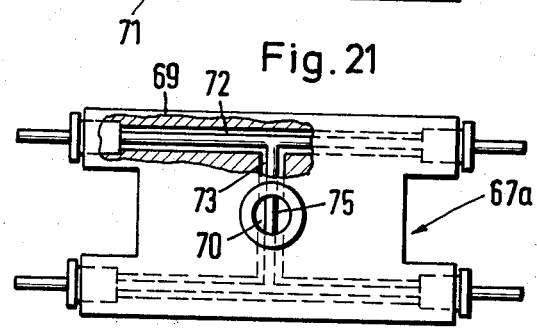
FIG. 21 is a partially sectioned view of a heating passage forming element having an H-shaped configuration.
Figure 23:
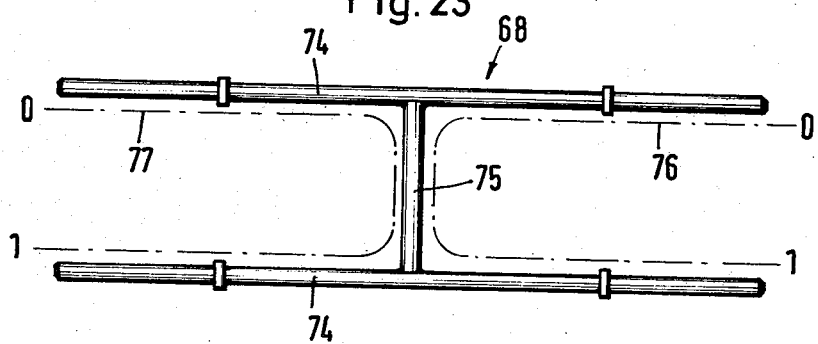
FIG. 23 is a view showing a heating member for the heating passage forming element of FIG. 22.

FIGS. 21 and 22 show a further embodiment of the present invention. In these Figures, a heating passage forming element 67a has an H-shaped configuration. The heating passage forming element is provided with an H-shaped electrical heating member 68. A housing 69 is provided with a feeding bush 70. It further has outlet openings 71 for the molten metal, which for example can be provided at each lateral end of a longitudinal passage 72. The longitudinal passages 72 are connected with one another via a transverse passage 73.

The electrical heating member 69 includes longitudinal heating portions 74 and a transverse heating portion 75. The electrical heating member 68 is heated by two transformers. The dotted lines 76 and 77 shows that a double stream flows through the transverse heating portion 75 as compared with the longitudinal heating portions 74. Since the transverse heating portion is heated too strong whereas the entire heating member 68 is constituted of identical material, the transverse heating portion 75 is tubular, its interior is filled with copper and it is welded with the longitudinal heating portion 74. Copper possesses a very low electrical resistance, so that the entire resistance of the transverse heating portion 75 is lower and thereby lower quantity of heat is generated in this region.

As can be seen from FIG. 21, the inlet opening for the molten plastic is arranged in the center of the transverse passage 73.

Figure 24:
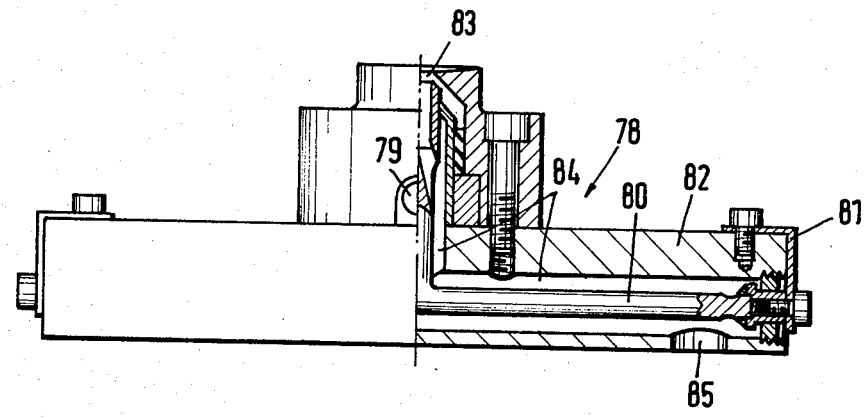
FIG. 24 is a partially sectioned view of a T-shaped heating passage forming element.

FIG. 24 shows a heating passage forming element 78 which is T-shaped. The heating passage forming element 78 has a central current-supply block 79. The ends of a heating member 80 are electrically connected via a contact angle 81 to mass which is formed by a housing 82.

The molten plastic is supplied via an injection head 83, flows through a T-shaped passage 84 and travels to the outlet openings 85. The nozzles 10 can be inserted into the outlet openings, or a coupling with another heating passage forming element can be provided in this region.

The above-described heating passage forming element provides for many possibilities of combining the same so as to construct different heating passages systems. When the injection mold is no longer needed or must be replaced, the heating passage forming elements can be utilized again. The electric heating members of the assembled heating passages system can be connected in series or parallel or can be controlled by transformers.

It will be understood that each of the elements described above, or two or more together, may also find a useful application in other types of constructions differing from the types described above.

While the invention has been illustrated and described as embodied in an arrangement for supplying molten plastic material to an injection mold, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended:

1. A hot runner injection manifold assembly having a single injection inlet and plural injection outlet nozzle suitable for coupling with a plural injection mold, comprising:
a first manifold member having an injection inlet connection and having plural apertures, each communicating with a passage of an elongated conduit member having at least one outlet nozzle suitable for coupling with the injection mold inlet, mainfold said mainfold member having an elongated flow passage substantially therethrough and a substantially straight rod-shaped elongated heating element extending completely therethrough and projecting therefrom at each end of said mainfold member.

2. A hot runner injection manifold assembly as defined in claim 1, wherein each of said conduit members has an axis, said conduit members including at least two conduit members which are connected with one another so that the axes of said two conduit members extend parallel to one another.

3. A hot runner injection manifold assembly as defined in claim 1, wherein each of said conduit members has an axis, said conduit members including at least two conduit members which are connected with one another so that the axes of said two conduit members are normal to one another.

4. A hot runner injection manifold assembly as defined in claim 1, wherein of said mainfold members has an axis, said mainfold member having at least two conduit members which are connected with one another so that the axes of said two conduit members are in alignment with one another.

5. A hot runner injection manifold assembly as defined in claim 1, wherein each of said heating elements is hollow and has an inner chamber filled with an electrically non-conductive material.

6. A hot runner injection manifold assembly as defined in claim 1, wherein each of said conduct members has a housing, each of said heating elements having a central region, each of said conduit members having a supporting member which supports said heating element relative to said housing in said central region.

7. A hot runner injection manifold assembly as defined in claim 1, having plural conduit members wherein said conduit members includes at least one conduit member with a housing having an axis, two axial ends provided with two outlet openings, and a central region located between said axial ends and provided with an inlet opening, said housing having an inner passage which has a cross section conically increasing from said inlet opening toward said two outlet openings.

8. A hot runner injection manifold assembly as defined in claim 1, wherein said heating elements have a round cross section.

9. A hot runner injection manifold assembly as defined in claim 1, wherein said heating elements have an angular cross section.

10. A hot runner injection manifold assembly as defined in claim 1, wherein said heating elements have a cross-shaped cross section.

11. A hot runner injection manifold assembly as defined in claim 1, wherein said heating elements have a star-like cross section.

12. A hot runner injection manifold assembly as defined in claim 1, wherein said conduit members plurality of said includes at least three conduit members connected with one another so as to form as upright U-shaped structure, two of said three conduit members which extend substantially vertically being provided with a plurality of nozzles arranged in several planes so as to correspond to a multilevel injection mold.

13. A hot runner injection manifold assembly as defined in claim 1, wherein said conduit members includes at least one conduit member which is T-shaped and has a central portion forming an injection head and provided with a current supply plug.

14. A hot runner injection manifold assembly as defined in claim 1, wherein said conduit members includes at least one conduit member which has two axial ends and an overflow opening for the molten plastic, provided at each of said axial ends.

15. A hot runner injection manifold assembly as defined in claim 14, wherein said one conduit member has a central region located between said axial ends and is provided with two holding members each arranged at a respective one of said axial ends and electrically connected with said heating element, said overflow openings being formed in said holding members, and said heating element being provided with a current supply in said central region.

16. A hot runner injection manifold assembly as defined in claim 1 having plural conduit members wherein said conduit members includes at least two connected conduit members which are located in two planes and have longitudinal axes which extend at right angles to one another.

17. A hot runner injection manifold assembly as defined in claim 16, wherein each of said conduit members has a housing, said housing of one of said two conduct members interengaging with said housing of the other of said conduit member so that the heating elements of said two conduit members are located relatively close to one another.

18. A hot runner injection manifold assembly as defined in claim 1, wherein said conduit members includes at least one conduit member which has an H-shaped cross section and whose heating element also has an H-shaped cross section.

19. A hot runner injection manifold assembly as defined in claim 18, wherein said H-shaped heating element includes two lateral heating portions connected with one another by an intermediate heating portion, said intermediate heating portion having a lower electrical resistance than said lateral heating portions.

20. A hot runner injection manifold assembly as defined in claim 19, wherein said intermediate heating portion is hollow and filled with a material having the lower electrical resistance.

21. A hot runner injection manifold assembly as defined in claim 20, wherein said hollow intermediate heating portion is filled with copper and welded to said lateral portions of said H-shaped heating member.

22. A hot runner injection manifold assembly as defined in claim 1, said manifold assembly having plural conduit member and wherein each of said conduit members has a housing and each of said housings has two axial ends, each of said heating elements being provided with a shoulder arranged near one of said axial ends of said housing of the same conduit member.

23. A hot runner injection manifold assembly as defined in claim 22, wherein each of said conduit members has an insulating body supporting said heating element in the region of said one axial end of said housing, said shoulder being formed adjacent to said insulating body.

24. A hot runner injection manifold assembly as defined in claim 22, wherein each of said heating elements has two axial ends and a portion of a reduced cross section located adjacent to one of said axial ends of said heating element.

25. A hot runner injection manifold assembly as defined in claim 24, wherein said portion of reduced cross section of each of said heating elements is formed by an indentation in the latter.

26. A hot runner injection manifold assembly as defined in claim 24, wherein each of said heating elements in the region of said portion of reduced cross section has a hole which is filled with an electrically conductive material.

27. A hot runner injection manifold assembly as defined in claim 1, wherein said manifold member has an upper surface and a plurality of side surfaces and is provided with said inlet connection in said upper surface and with said apertures in said side surfaces each of said conduit members having an inlet opening for its passage and communicating with the respective aperture of said manifold.

28. A hot runner injection manifold assembly as defined in claim 27, wherein each of said conduit members has an axis and two axial end faces, said inlet opening of each of said conduit members being provided at at least one of said two end faces.

29. A hot runner injection manifold assembly as defined in claim 28, wherein each of said conduit members has a hollow sleeve extending axially outwardly of said housing and bounding said inlet opening, said manifold member having a plurality of recesses each receiving said hollow sleeve of a respective one of said conduit members.

30. A hot runner injection manifold assembly as defined in claim 29, wherein said hollow sleeve has a round cross-section.

31. A hot runner injection manifold assembly as defined in claim 29, wherein said recess is formed as a threaded opening, said hollow sleeve being provided with a threaded flange screwable into said threaded opening, each of said conduit members having a holding insert which is constituted of electrically conductive material and has a flange which is fixed by said threaded flange of said hollow sleeve.

32. A hot runner injection manifold assembly as defined in claim 31 wherein each of said conduit members has a heating element, said heating element having two axial ends, said holding insert being connected with are axial end, of said heating element and provided with at least one overflow opening for molten plastic material.

* * * * *